Apr. 17, 1923.

H. E. LUEBKER 1,452,303

MILKING STOOL

Filed July 14, 1922

Inventor
Henry E. Luebker,

By
Attorney

Patented Apr. 17, 1923.

1,452,303

UNITED STATES PATENT OFFICE.

HENRY E. LUEBKER, OF PLUM CITY, WISCONSIN.

MILKING STOOL.

Application filed July 14, 1922. Serial No. 575,092.

*To all whom it may concern:*

Be it known that HENRY E. LUEBKER, a citizen of the United States of America, residing at Plum City, in the county of Pierce and State of Wisconsin, has invented new and useful Improvements in Milking Stools, of which the following is a specification.

The object of the invention is to provide a milking stool for use in dairy barns which may readily be positioned to suit the convenience of the operator without involving the inconvenience of carrying the conventional stool from one animal to another and without the risk of having the stool kicked from beneath the operator while engaged in the milking operation, and which at the same time is conveniently out of the way when not required, and with this object in view the invention consists in a construction and combination of parts of which a preferred embodiment is shown in the accompanying drawings, wherein:—

Figures 1, 2:
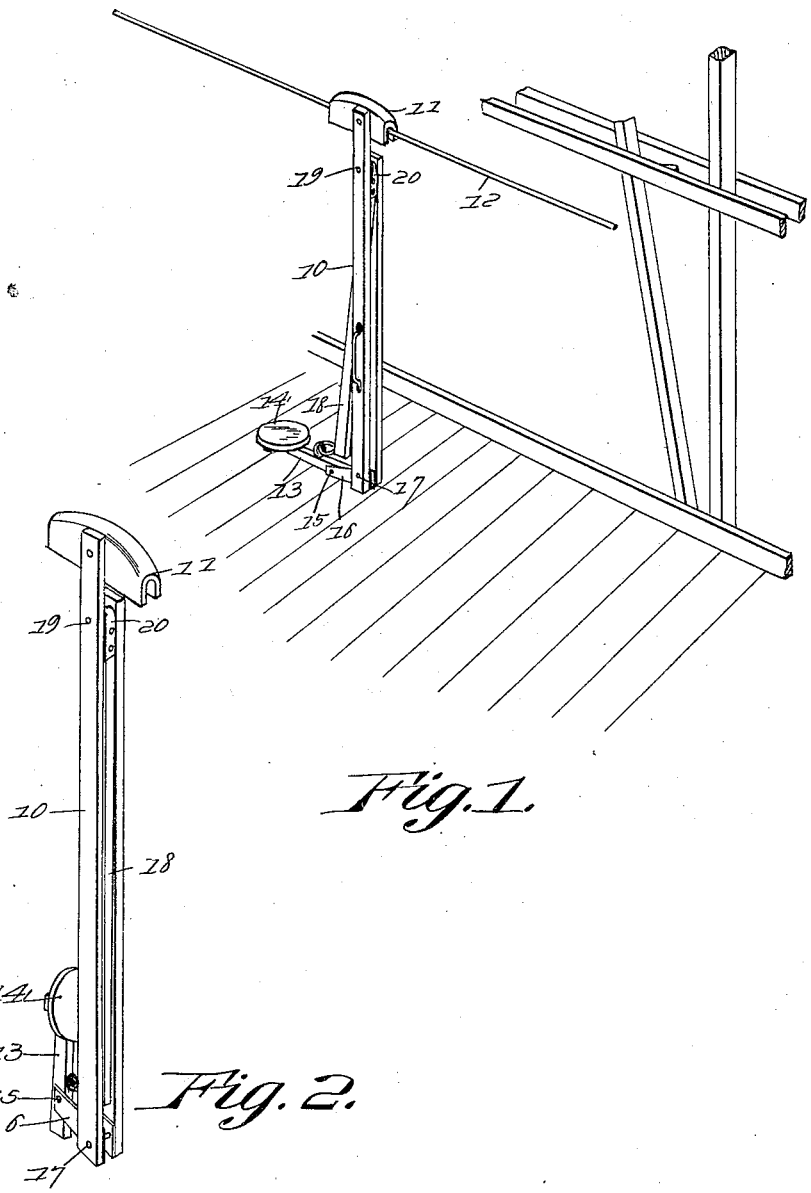
Figure 1 is a view of a milking stool constructed in accordance with the invention mounted in operative position in a dairy shed or barn.
Figure 2 is a detail view of the same in its folded condition.

The device consists essentially of a hanger bar 10 connected with a traveler 11 which is adapted to traverse a track 12 prominently positioned in the structure having the stalls for the animals and extending parallel with the series of stalls to permit of positioning the hanger in convenient relation with the animal occupying any particular stall, and carried by said hanger bar is a foldable pivotally mounted seat carrying arm 13 which is yieldingly held in its folded position as indicated in Figure 2 in substantial parallelism with the hanger bar.

In the construction illustrated the arm 13 which carries a seat 14 of any convenient shape and size to suit the operator is pivotally mounted as at 15 between ears 16 which in turn are pivotally mounted as at 17 in the bifurcated lower end of the hanger bar and is connected with a tongue 18 pivoted also in the bifurcation of the hanger bar at 19 and is provided with an actuating spring 20 tending to fold the tongue and thereupon swing the seat carrying arm when released into a folded position into substantial parallelism with the hanger bar. In practice as indicated in the drawing it is preferred to construct the hanger bar of a plurality of parallel side timbers which at their upper ends are arranged at opposite sides of the traveler 11 and thus afford space between their inner sides for the accommodation of the spring actuated tongue and the ears 15, so that when the seat carrying arm is in its operative position the rear end thereof fits between the extremities of the members of the hanger bar and bears against the cross pin 17 which serves as a stop to limit the depression of the seat. As soon as the weight of the operator is removed from the seat the spring actuated tongue acts to fold the same into a position which avoids obstructing the movements of the operator in passing from one wall to another.

Having described the invention, what is claimed as new and useful is:—

1. A milking stool for use in connection with a plurality of stalls having a hanger bar provided with a traveler for traversing an overhead track, and a seat carrying arm foldably mounted on the hanger bar, the hanger bar being provided with a spring actuated tongue operatively connected with the seat carrying arm for yieldingly holding the latter in folded relation with said bar.

2. A milking stool for use in connection with a plurality of stalls having a hanger bar provided with a traveler for traversing an overhead track, and a seat carrying arm foldably mounted on the hanger bar, the hanger bar being bifurcated at its lower end with the seat carrying arm mounted for swinging movement in a plane between the elements of the bifurcation and a stop pin arranged in the path of movement of the rear end of said arm for limiting the depression of the seat carrying end thereof.

3. A milking stool for use in connection with a plurality of stalls having a hanger bar provided with a traveler for traversing an overhead track, and a seat carrying arm foldably mounted on the hanger bar, said hanger bar consisting of parallel spaced elements provided at their lower extremities with forwardly directed ears between which the seat carrying arm is pivotally mounted, and the said tongue being mounted between said elements and terminally connected with the seat carrying arm.

In testimony whereof he affixes his signature.

HENRY E. LUEBKER.